Dec. 4, 1951  W. B. HORTON  2,577,523
HINGED SHEAVE CONSTRUCTION
Filed Nov. 22, 1949  5 Sheets-Sheet 1
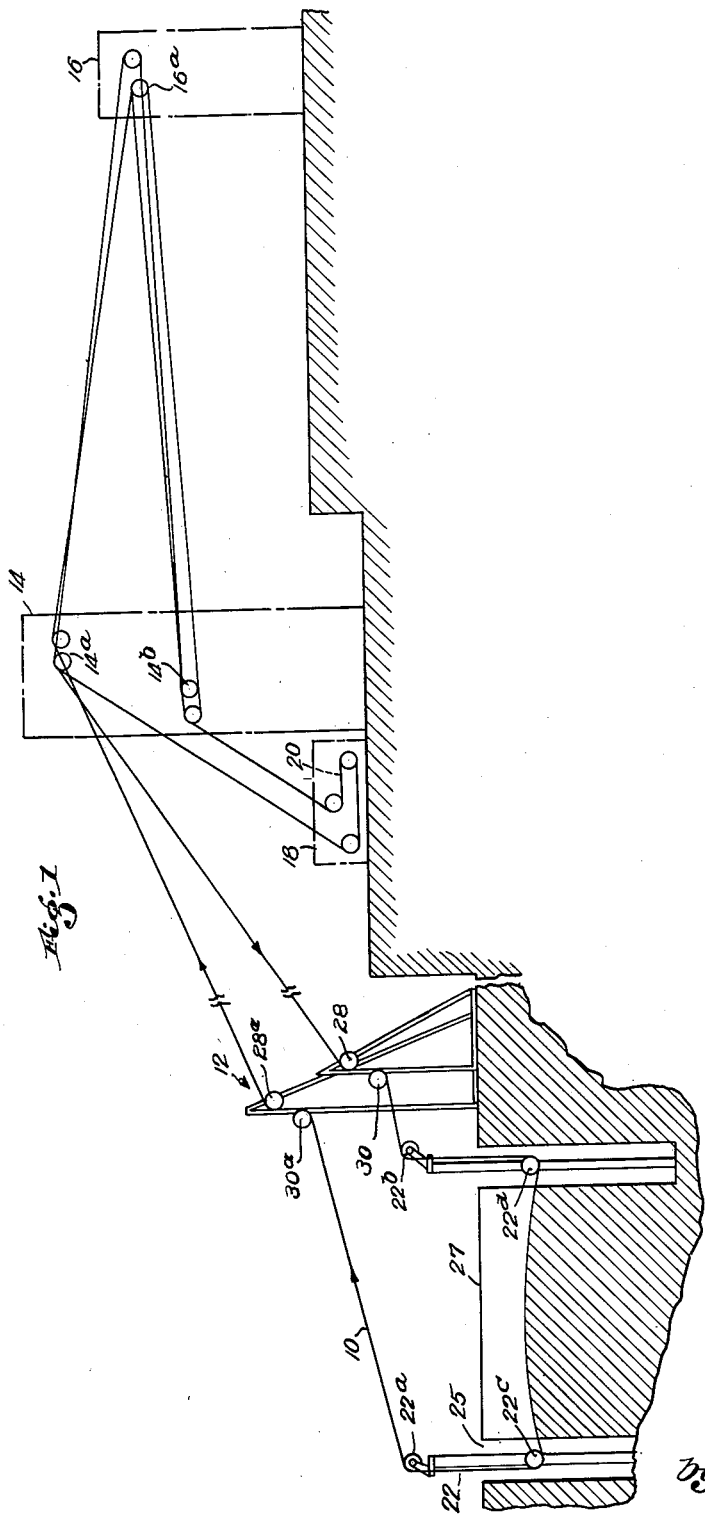
Inventor
William B. Horton
by
Attys.

Dec. 4, 1951 W. B. HORTON 2,577,523
HINGED SHEAVE CONSTRUCTION
Filed Nov. 22, 1949 5 Sheets-Sheet 2
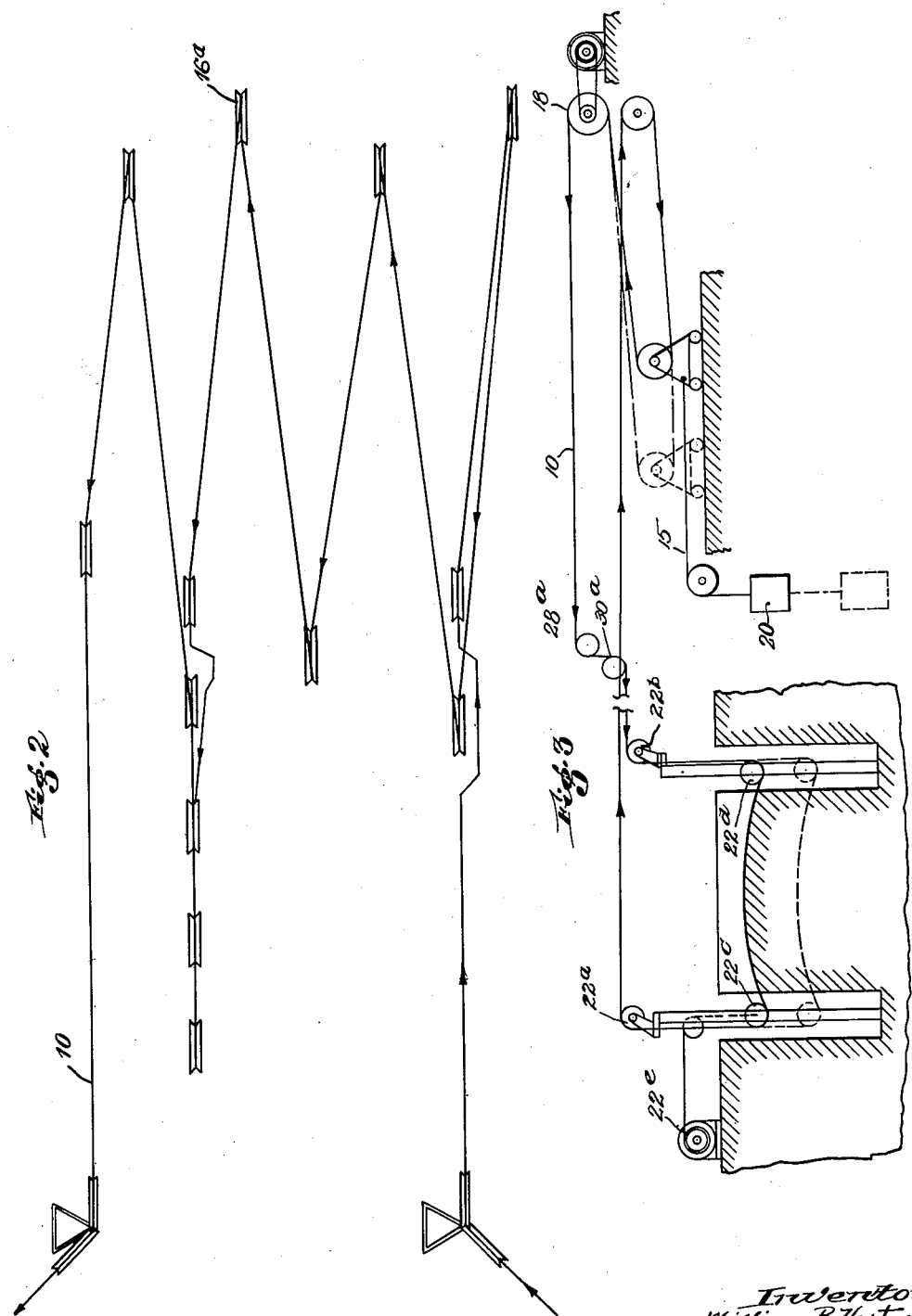
Inventor:
William B. Horton
by Munson H. Hamilton,
his Atty.

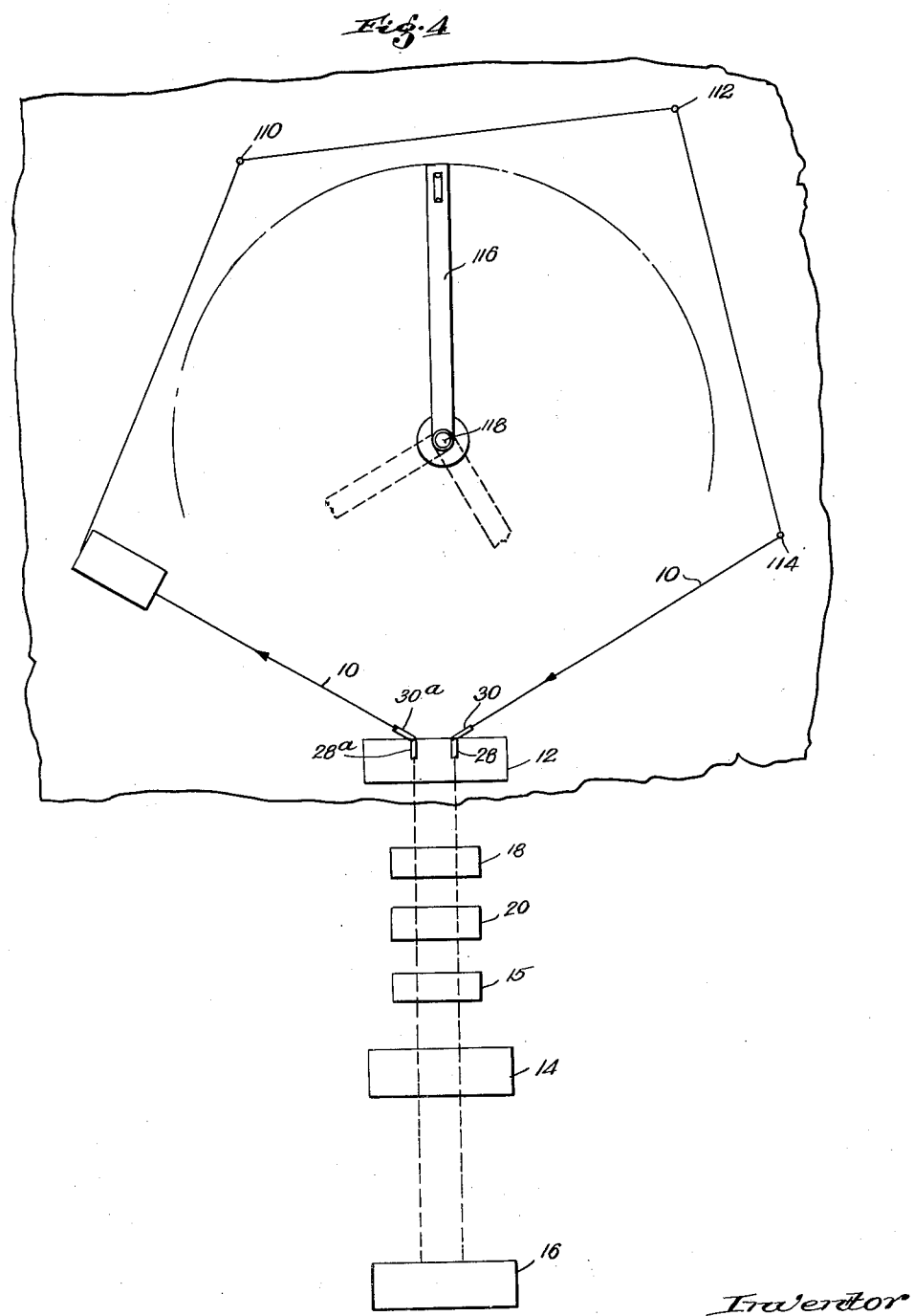

Dec. 4, 1951 W. B. HORTON 2,577,523
HINGED SHEAVE CONSTRUCTION
Filed Nov. 22, 1949 5 Sheets-Sheet 4
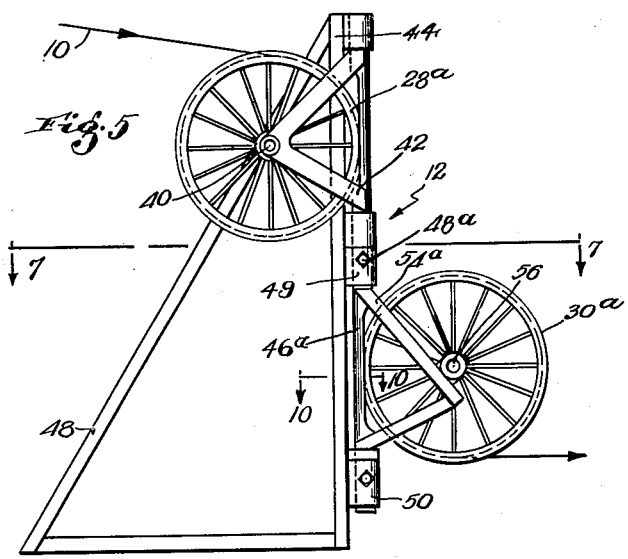
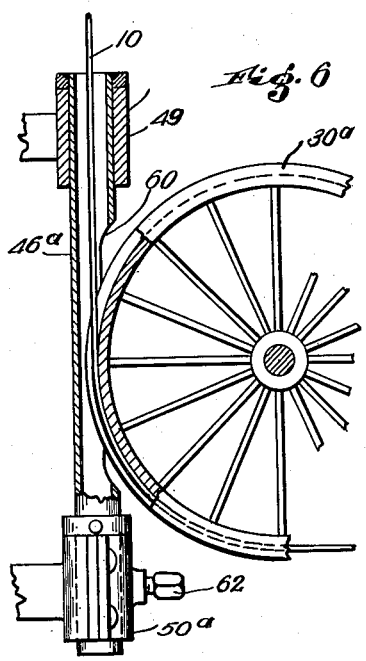
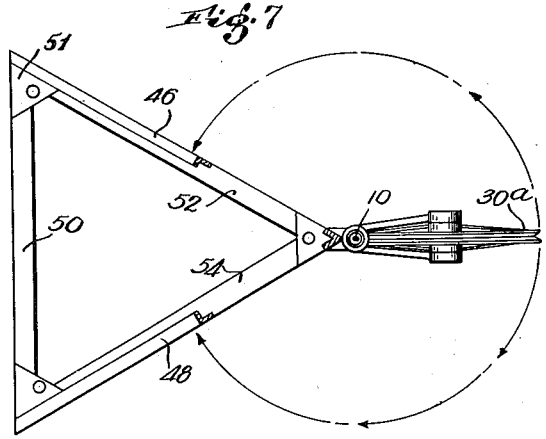
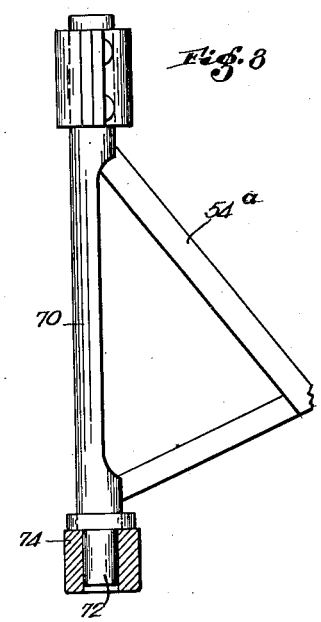
Inventor:
William B. Horton
by Munn H. Hamilton
his Atty.

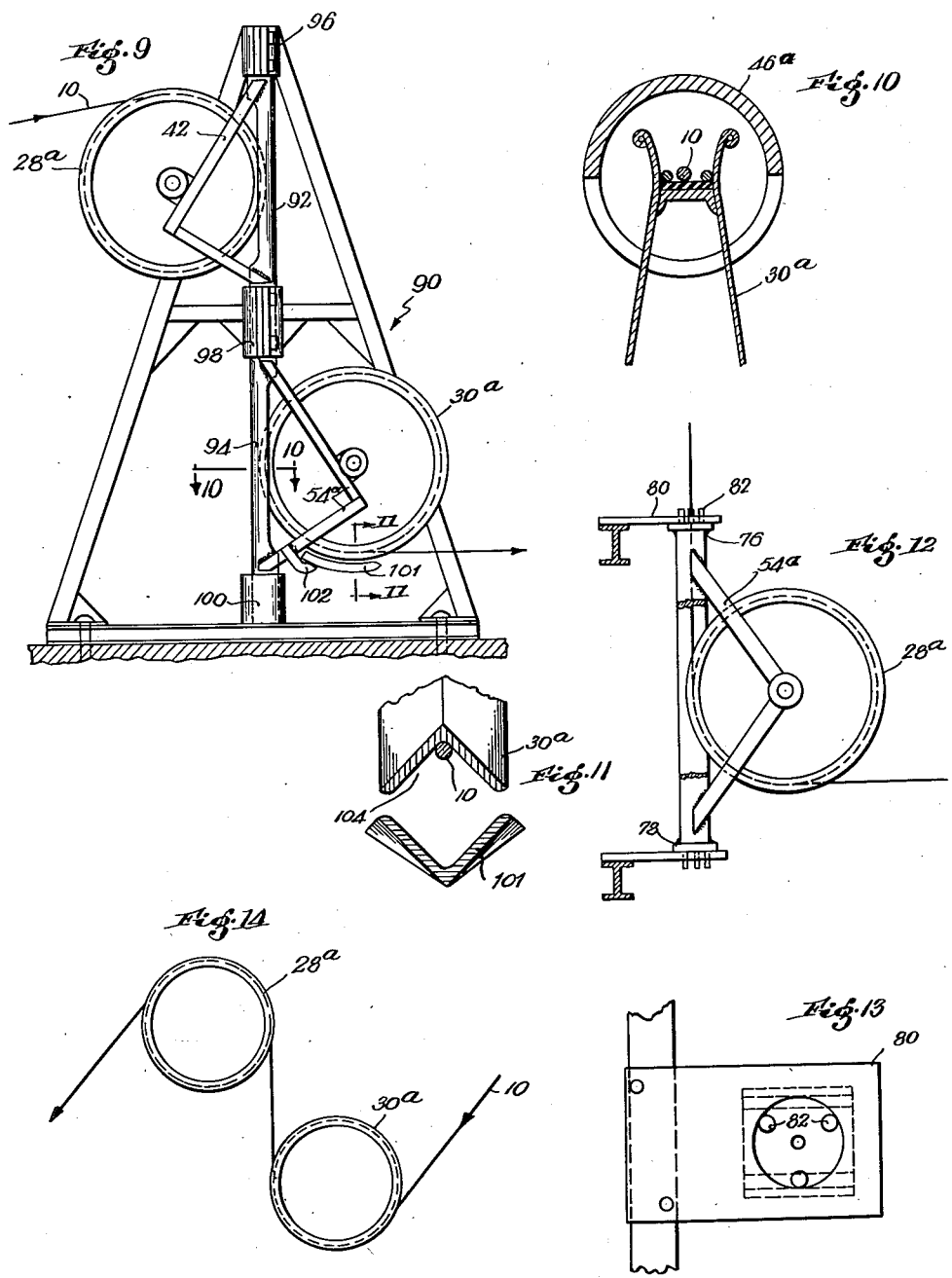

Patented Dec. 4, 1951

2,577,523

UNITED STATES PATENT OFFICE 2,577,523

HINGED SHEAVE CONSTRUCTION

William B. Horton, Groton, Mass., assignor to H. E. Fletcher Company, West Chelmsford, Mass., a corporation of Massachusetts Application November 22, 1949, Serial No. 128,815

2 Claims. (Cl. 125—21)

This invention relates to an improved sheave unit which may be employed in combination with conventional wire sawing apparatus for selectively guiding an endless wire saw along different paths of movement desired to be followed in the course of moving the saw into contact with stone surfaces in quarries and at other points where stone processing operations are carried out.

In the course of such sawing operations, there frequently arise occasions where a great deal of flexibility is required. A particular instance of this is in connection with leading a rapidly moving endless wire saw into and out of a stone quarry where a relatively large amount of power equipment, such as derricks, masts, guy wires and the like are in use. Since a conventional wire saw device is of relatively cumbersome nature, such an apparatus is difficult to move about. A common practice is to resort to a permanently installed supporting structure between the component parts of which the wire moves along a substantially straight line. As the wire leaves this fixed structure, it must be turned from its straight line path in order to guide the wire around obstructions referred to or to reach a desired point which is not directly in line with the supporting structure. Also it usually is the case that stone production may be in progress at several different levels in the quarry or outside of the quarry, and hence it may be required to change the direction of the wire in vertical planes in order to guide the wire above and below certain points in the quarry as well as around them.

An object of the invention therefore is to devise an improved sheave arrangement which is capable of handling relatively long lengths of a wire saw with greatly increased flexibility in making sharp turns or in going from one level to another, having due regard for the fact that the wire is traveling at a relatively high rate of speed. It is also an object of the invention to combine with conventional sawing sheaves and conventional wire furnishing means, a set of orienting or guide sheaves so arranged as to prevent the wire member from falling away from either one or both of the sheave members during a drop in the tension in the wire such as may take place for instance during a change in demand of the sawing sheaves; or when a break in the wire occurs; or when operation of the apparatus is brought to a halt.

It is still further an object of the invention to provide a portable orienting sheave unit which can readily be moved about into various relative positions between sawing sheaves and wire furnishing means where most convenient operating conditions may be encountered. Still another object of the invention is to improve wire sawing equipment generally and to devise more efficient and cheaper sawing operations which will increase quarry output and reduce the time and labor involved as well as preventing waste of stone.

These and other objects and novel features will be more fully understood and appreciated from the following description of a preferred embodiment of the invention, selected for purposes of illustration and shown in the accompanying drawing, in which Fig. 1 is a view in side elevation illustrating diagrammatically a section of a quarry and a wire sawing apparatus which includes the orienting sheave arrangement of the invention arranged in a typical operating position;

Fig. 2 is a plan view further illustrating parts of the wire sawing apparatus shown in Fig. 1 and indicating diagrammatically one method of reeving a wire saw element in supporting towers;

Fig. 3 is a side elevational view illustrating diagrammatically wire furnishing means arranged to supply wire in accordance with the demand of a typical wire sawing tower;

Fig. 4 is a plan view diagrammatically indicating a series of different paths along which a wire saw may be desired to be guided in connection with one type of sawing operation;

Fig. 5 is a side elevational view illustrating one form of orienting sheave unit of the invention;

Fig. 6 is an enlarged fragmentary elevational view partly in cross section of the sheave unit shown in Fig. 5;

Fig. 7 is a plan view of the device shown in Figs. 5 and 6;

Fig. 8 is an elevational view of a modified sheave supporting mechanism;

Fig. 9 is a plan view of another form of sheave unit of the invention;

Fig. 10 is a plan cross-sectional view taken on the line 10—10 of Fig. 9;

Fig. 11 is a cross section taken on the line 11—11 of Fig. 9;

Fig. 12 is a side elevational view of another form of sheave mounting;

Fig. 13 is a detail plan view of a part of the structure shown in Fig. 12; and

Fig. 14 is a diagrammatic view illustrating an alternate sheave and wire position.

The sheave mechanism of the invention may be more easily understood from a consideration of one practical application in a granite quarry although it should be understood that the invention is not limited to this mode of operation or to the application hereinafter described. Attention is directed to Figs. 1 and 2 of the drawings in which there has been indicated diagrammatically a typical arrangement of an endless wire saw apparatus as employed for example in cutting or sawing relatively hard mineral bodies such as are found in granite quarries of the open it type. Such an open pit quarry, shown diagrammatically in Fig. 4, may include a considerable area and extend into the earth for a depth of from one to several hundred feet. Regardless of the point at which the saw is to be applied, it should be understood that there is necessarily involved an apparatus of considerable magnitude and especially so with respect to the sawing wire, which is required to have a substantial reach.

Then too in actual practice, sawing of the relatively harder stones such as granite may result in greatly increased wear of the wire saw element. To reduce such wear, it is helpful to utilize greatly increased lengths of wire saw. Thus as an instance of suitable saw dimensions applied successfully in one open pit quarrying operation, there have been employed helical wire saws in lengths running from 10,000 feet or less all the way up to 20,000 feet or more. A gang of these saws in the lengths indicated, and including as many as six or more separate saws, may be operated simultaneously, running in parallel spaced-apart relation to one another.

Under these conditions, it will be understood that extensive wire supporting structures and sheaves are desirable both for supporting and driving these relatively great lengths of wire. In the apparatus shown in Figs. 1–4 inclusive, a series of supporting towers or stands are arranged in line with one another in a direction extending away from the quarry for a suitable distance such as for example 1500 feet. The towers in each instance may have a height of from 50 to 100 feet and a span of roughly 40 to 60 feet. Each tower is provided with multiple sheave means along which the series of wire saws may be driven under a tension of about 300 pounds at speeds of from 3000 up to 4000 feet per minute for example.

For purposes of understanding the invention, the sawing apparatus illustrated in Figs. 1 and 2 may be thought of as being made up of three principal parts comprising a pair of sawing towers and a vertically adjustable set of sawing sheaves for urging a wire into sliding contact with a granite or other rock surface; wire furnishing means for delivering the wire in suitable lengths in response to demand of the sawing sheaves; and orienting sheaves interposed between the sawing towers and the wire furnishing means at one or more points. The wire furnishing means ordinarily includes the wire supporting towers shown at the right of Fig. 1; power means for driving the wire, preferably located outside the quarry in close proximity to one of the towers; and a mechanism associated with the power means for varying the length of the wire while maintaining a substantially constant tension (Fig. 3). In the arrangement about to be described, the sheave mechanism of the invention is employed in one of the towers as a constituent part of the wire furnishing means but may be otherwise utilized as will appear at another point in the description.

In the structure shown in Fig. 1, numeral 10 denotes an endless wire saw member. One desirable reeving arrangement for the wire 10 has been suggested in Fig. 2. As noted in these figures, saw member 10 is shown supported in a raised position by means of three wire supporting structures or towers 12, 14 and 16, each of which may for example consist of a metal framework bolted together and mounted at spaced-apart intervals in alinement with the quarry as suggested in Fig. 4.

Tower 12 carries the orienting sheave mechanism of the invention. As noted by arrows (Fig. 1), the wire member 10 passes over conventional guide sheaves 16a of tower 16, and two sets of conventional guide sheaves 14a and 14b of tower 14. The improved sheave unit of the invention including orienting sheaves 28, 30, 28a and 30a are mounted in tower 12. As shown diagrammatically in Fig. 1, the two sets of orienting sheaves lie one above another, of which a lower set of sheaves 28 and 30 receive outgoing portions of wire 10, and an upper set of sheaves 28a and 30a carry incoming portions of wire 10.

Preferably the three towers 12, 14 and 16 are engaged in substantial alinement with one another (as shown in Fig. 4) so that the wire 10 is guided along vertical planes which deviate only slightly from the planes of rotation of the sheaves. Wire 10 passes to a power-driven sheave 18, preferably mounted outside the quarry pit between tower 12 and tower 14. Near unit 18 is located a mechanism 20 for maintaining tension and for varying the length of wire in operation at any given time in response to the demand of the sawing towers, indicated at the lower left-hand side of Fig. 1. Included in the sawing towers 22 is a set of four sheaves 22a, 22b, 22c and 22d. Sheaves 22c and 22d are vertically adjustable by means of a conventional winch mechanism 22e (Fig. 3). Sheaves 22a and 22b are secured at the upper sides of the sawing towers in some convenient manner.

The upper set of orienting sheaves of the invention as utilized in tower 12, has been illustrated in greater detail in Figs. 5–7 inclusive. As shown therein, sheave 28a is mounted for rotation in a vertical plane on a shaft 40 supported between a pair of arms 42. The latter members 42 are solidly secured to an upright 44 which is a part of the framework of the tower 12. The remaining parts of the tower consist of a pair of supporting legs 46 and 48 which are angularly disposed and meet with the upright 44. The lower ends of the legs extend downwardly to join with triangular base members 50, 52 and 54. At the bottom of tower 12 are solidly secured corner pieces 51 which are formed with openings through which may be received fastening means for detachably anchoring the tower in a desired position in a quarry.

Sheave 28a is suspended by means of arms 42 from the upright 44 at two points, one of which occurs well above the top of the sheave, the other of which occurs below the sheave to furnish a rigid braced support which is capable of withstanding a considerable vertical load exerted on the top of the sheave. This arrangement, together with the triangular type tower construction, affords a high degree of strength and stability.

The arms 42 are so disposed as to locate the sheave 28a in an overhanging position in which a peripheral edge portion of the sheave projects beyond the right-hand side of the upright 44 as viewed in Fig. 5. In such a position, the wire saw 10 moving in a direction from left to right, as viewed in Fig. 5, is led outwardly beyond the upright 44 and then downwardly in spaced parallel relation to this member.

Fastenings 48a secured to the upright member 44 support two cylindrical split sleeves 49 and 50a in which is pivotally received a tubular member 46a. Secured to the tubular member 46a are arms 54a. A lower sheave 30a is mounted for rotation in a vertical plane about a shaft 56 which is supported at either end in bearings 56a fast on the arms 54a. The disposition of the arms 54a is so chosen as to locate a peripheral portion of the sheave 30a tangent to a vertical axis which extends upwardly into tangential relation with the periphery of the sheave 28a as shown in Fig. 5.

The wire saw 10 is passed down over the sheave 28a through the tubular member 46a as shown in Figs. 6 and 10 and is then led out around the lower sheave 30a. The tubular member may if desired be cut away along one side to leave an opening 60 into which the rim of sheave 30a can project as suggested in Fig. 6.

It will thus be seen that I have provided a unique sheave arrangement in which there are two sheaves both suspended from a common vertical support and at least one of which can be swung or pivoted in a hinge-like manner about a vertical axis which is parallel to the vertical support and tangent to peripheral portions of both of the suspended sheaves. With this arrangement, sheave 30a can be rotated about a vertical axis which is tangent to a peripheral portion of sheave 28a in all positions. It should also be observed that each of the sheaves in the preferred forms of the invention described includes a two-point suspension feature which imparts a maximum of rigidity and strength to resist sudden changes in load in a rapidly moving wire.

In any desired position in which the sheave 30a is oriented, it may be secured by means of set screws 62. Regardless of the position into which sheave 30a is pivoted and fastened, there will be a vertical path along which wire 10 may be guided from the sheave 28a to sheave 30a without being allowed to leave either sheave at an untrue angle. This allows the outgoing portions of wire 10 to be led off safely in any direction regardless of the change of tension, and the essential turning operation is efficiently carried out.

The tubular member 46a and the sleeves 49 and 50a constitute a preferred form of sheave mounting which permits the wire 10 to run vertically through the axis of the hinged sheave 30a. Other arrangements for this purpose may also be utilized such as shown in Fig. 8 in which a tubular member 70 is fitted at its lower end with a pin 72 which is pivoted in a bearing 74 adapted to be secured to the upright 44. In place of a tubular member there may be employed a construction such as that shown in Figs. 12 and 13 in which the mounting consists of upper and lower plates 76 and 78 supported by brackets 80. Within the plates are secured rods 82 which define a vertical passageway through which the wire saw may be run. Sheave 28a and arms 54a are swivelled about this structure in the same manner as illustrated in Fig. 1.

It will be apparent that the sheave arrangement described has the further virtue of being able to receive and safely guide a wire member through various angles occurring in vertical planes as well as horizontal planes. Thus a wire which is led into sheave 28a from a point above this member will be constrained to conform to the vertical path between sheave 28a and 30a. This causes the wire to engage firmly with the upper grooved portion of the sheave 28a so long as any substantial bending of the wire takes place. The same relative situation is found to be true with respect to the lower sheave 30a which enables an operator to safely raise or lower the outgoing portions of the wire at the same time that the wire is turned in a horizontal plane.

Another important function of the orienting sheaves of the invention is a supporting of the wire 10 so that it is to a very great extent prevented from falling away from either one of the two sheaves. Considering each of the sheaves from the point of view, it will be observed that by causing the wire to pass downwardly along a vertical path at points between the sheaves, the natural tendency of the wire in response to the action of gravity is to hang in this vertical position when not subjected to tension.

It will be apparent that where a wire saw is running under a very considerable tension and something happens to modify or terminate this tension, such as a break in the saw itself or in response to a change in position of the sawing sheaves, there may develop a sudden relaxation in tension and there will be a considerable tendency for the wire member to whip out of line and become disengaged from the sheave grooves.

While it is not contended that the sheave arrangement of the invention will prevent flexing of the wire, it does tend to cushion and absorb such reaction in the wire and prevent a disturbance from being transmitted along the line. Moreover any serious displacement of the wire out of the sheave grooves is almost entirely prevented and a constant uniform leading off of the wire is assured since a change in tension from either direction of the sheaves does not alter its predisposition to assume a vertical position by gravity. Thus if a rippling effect or other disturbance occurs, it will be seen that its tendency to move the saw away from the nearer of the two sheaves will be counteracted by the restraining action of the more distant sheave with the saw being constantly forced back into a vertical position where it lies in alinement with the sheave groove.

As will be apparent from an inspection of Fig. 7, the tower 12 affords a relatively wide operating range since the sheave 30a may be swung through an arc encompassing roughly 300° assuming the sides of the base of the tower meet at an angle of 60° for example. With such a range of flexibility, taken with the fact that the wire 10 may be angled upwardly or downwardly to a marked degree, almost all practical operating conditions can be satisfactorily dealt with.

In the same general connection, it is pointed out that even greater flexibility may be developed in a modification of tower structures such as indicated in Fig. 9 in which a tower 90 is formed with an upright member as before to which are attached two tubular members 92 and 94 mounted one above the other for rotation about the same vertical axis and being swivelled on bearings 96, 98, and 100 in such a manner that either of the sheaves 28a or 30a may be separately pivoted about a vertical axis.

With this arrangement the entire tower structure may be rotated about a vertical axis if desired and thus allow a wire to be passed from a point above the sheaves downwardly under the lower sheave 30a (Fig. 14) and then up over the sheave 28a with the latter member being swung into any desired position and fastened.

In Fig. 9 there has also been shown an additional wire guiding mechanism consisting of a V-shaped member 101 which is supported in spaced relation to the under side of sheave 30a by means of a strap 102 secured to one of the arms 54ª. The position of the guide 101 is chosen so that as the wire 10 drops away from the lowermost surface of sheave 30a, it is received in the throat of this member and thus held in a position in which it will necessarily be drawn into the groove 104 of the sheave 30a whenever tension is exerted. A similar guide may also be employed at the top of the sheave unit or other desired points.

One of the more important applications of the sheave unit of the invention is in combination with the wire furnishing means and the sawing towers as illustrated in the drawings. The reason for this is that the region between these two devices is a somewhat critical one. Adjustments must be made here in length and tension of the wire and they necessarily must take place in many instances concurrently with the wire being flexed to follow a new course as is evident from an inspection of Fig. 3. With the increasing speeds at which the wire may be desired to be driven, complications tend to develop which greatly affect the efficiency of the whole sawing operation.

Inserted between the sawing sheaves and the wire furnishing means therefore, the sheave unit of the invention becomes a vital link in the system, cooperating with the furnishing means on the one hand to safely turn and direct a rapidly moving wire body into almost any desired direction, and on the other hand with the sawing sheave to transmit a change in demand to the furnishing means without danger of the wire becoming disengaged from sheaves at any point along the line.

Other applications of the sheave unit of considerable importance are also possible such as in leading a wire saw from one to another of a series of points running around a quarry as suggested in Fig. 4. Thus each of the points 110, 112, 114 for example may constitute turning points through which the saw may be guided in order to avoid the boom 116 of derrick 118 or for other reasons. The ease with which this may be accomplished is readily appreciated from the fact that the triangular type sheave tower 12 is highly portable and of relatively light construction adapted to being gathered up in a sling or other lifting medium and then transported by the derrick. Various other applications suggest themselves in this general connection.

I claim:

1. A wire sawing apparatus comprising a wire member, a plurality of sheaves formed with peripheral grooves for urging the wire into sliding contact with a surface to be sawn, shafts upon which said sheaves are mounted, means for furnishing wire to the sheaves, sheave guide means adapted to receive wire from the wire furnishing means and to guide the wire to the sawing sheaves along conveyor paths of travel, said sheave guide means including a supporting base, an upright member secured on the base, mounting means for said sheaves including superimposed, vertically and axially arranged, elongated housing bodies fixed to said upright and having elongated openings at one side thereof for receiving peripheral portions of said sheaves, one of said housings being rotatably supported by said upright, and spaced pairs of arms fixed to said housings at vertically spaced points and converging toward each of said sheave shafts, and means for supporting said shafts on adjacent pairs of spaced arms.

2. A wire sawing apparatus comprising a wire member, a plurality of sheaves formed with peripheral grooves for urging the wire into sliding contact with a surface to be sawn, means for furnishing wire to the sheaves, guide sheave means adapted to receive wire from the wire furnishing means and to guide the wire to the sawing sheaves along varying paths of travel, said guide sheave means including a supporting base, an upright member secured on the base, sheave members mounted for rotation in vertical planes, one above the other, on said upright member, said mounting means for the sheave members including elongated housings having openings at one side thereof for receiving peripheral portions of said sheaves, said housings being arranged in axial alignment with one another, means securing one of said housings to said upright for swinging movement about a vertical axis which is perpendicular to the base of the frame and which is tangent to both the upper and lower sheaves at the centers of the respective sheave grooves, arms for supporting at least one of said sheaves on its respective housing body from two spaced-apart points occurring above and below the axis of rotation of said sheave, and means for securing said swinging sheave support in adjusted position.

WILLIAM B. HORTON.

REFERENCES CITED

The following references are of record in the file of this patent:

UNITED STATES PATENTS

| Number | Name | Date |
|---|---|---|
| 594,542 | Knobel | Nov. 30, 1897 |
| 1,155,156 | Lespagnol | Sept. 28, 1915 |
| 2,019,386 | Benedini | Oct. 29, 1935 |
| 2,351,175 | Wilhelm | June 13, 1944 |

FOREIGN PATENTS

| Number | Country | Date |
|---|---|---|
| 98,977 | Germany | May 15, 1897 |
| 395,568 | France | Mar. 9, 1909 |